(12) United States Patent
Juelich et al.

(10) Patent No.: US 11,461,355 B1
(45) Date of Patent: Oct. 4, 2022

(54) ONTOLOGICAL MAPPING OF DATA

(71) Applicant: Palantir Technologies Inc., Palo Alto, CA (US)

(72) Inventors: Jakob Juelich, London (GB); Joel Ossher, Oakton, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 273 days.

(21) Appl. No.: 15/997,419

(22) Filed: Jun. 4, 2018

Related U.S. Application Data

(60) Provisional application No. 62/671,941, filed on May 15, 2018.

(51) Int. Cl.
| | | |
|---|---|---|
| *G06F 16/25* | (2019.01) | |
| *G06F 16/28* | (2019.01) | |
| *G06F 40/177* | (2020.01) | |
| *G06F 40/194* | (2020.01) | |

(52) U.S. Cl.
CPC .......... *G06F 16/258* (2019.01); *G06F 16/289* (2019.01); *G06F 40/177* (2020.01); *G06F 40/194* (2020.01)

(58) Field of Classification Search
CPC .... G06F 16/258; G06F 16/289; G06F 40/194; G06F 40/177
USPC .......................................................... 707/752
See application file for complete search history.

(56) References Cited

U.S. PATENT DOCUMENTS

| | | | |
|---|---|---|---|
| 5,596,746 A | * | 1/1997 | Shen ..................... G06F 16/289 |
| 6,289,338 B1 | | 9/2001 | Stoffel et al. |
| 6,463,404 B1 | | 10/2002 | Appleby |
| 6,523,172 B1 | | 2/2003 | Martinez-Guerra et al. |
| 6,539,538 B1 | | 3/2003 | Brewster et al. |
| 6,640,231 B1 | | 10/2003 | Andersen et al. |
| 6,748,481 B1 | | 6/2004 | Parry et al. |
| 6,877,137 B1 | | 4/2005 | Rivette et al. |
| 7,027,974 B1 | | 4/2006 | Busch et al. |
| 7,089,541 B2 | | 8/2006 | Ungar |

(Continued)

FOREIGN PATENT DOCUMENTS

| | | |
|---|---|---|
| CA | 2666364 | 1/2015 |
| DE | 102014204840 | 9/2014 |

(Continued)

OTHER PUBLICATIONS

"A Tour of Pinboard," <http://pinboard.in/tour> as printed May 15, 2014 in 6 pages.

(Continued)

*Primary Examiner* — Robert W Beausoliel, Jr.
*Assistant Examiner* — Arthur Ganger
(74) *Attorney, Agent, or Firm* — Sheppard Mullin Richter & Hampton LLP

(57) ABSTRACT

Systems, methods, and non-transitory computer readable media are provided for mapping data based on an ontology of a platform. A data set may be obtained. Data within the data set may be for use by an operation platform based on an operation ontology. The operation ontology may define an operation data structure for the operation platform. The data may be shaped based on a target ontology. The target ontology may define a target data structure for a target platform. The data may be shaped such that the data is mapped to the target data structure.

19 Claims, 8 Drawing Sheets

(56) References Cited

U.S. PATENT DOCUMENTS

| | | | |
|---|---|---|---|
| 7,237,192 | B1 | 6/2007 | Stephenson et al. |
| 7,240,330 | B2 | 7/2007 | Fairweather |
| 7,533,069 | B2 | 5/2009 | Fairweather |
| 7,685,083 | B2 | 3/2010 | Fairweather |
| 7,877,421 | B2 | 1/2011 | Berger et al. |
| 7,962,495 | B2 | 6/2011 | Jain et al. |
| 8,117,022 | B2 | 2/2012 | Linker |
| 8,132,149 | B2 | 3/2012 | Shenfield et al. |
| 8,271,948 | B2 | 9/2012 | Talozi et al. |
| 8,332,354 | B1 | 12/2012 | Chatterjee et al. |
| 8,418,085 | B2 | 4/2013 | Snook et al. |
| 8,489,623 | B2 | 7/2013 | Jain et al. |
| 8,560,494 | B1 | 10/2013 | Downing |
| 8,689,182 | B2 | 4/2014 | Leithead et al. |
| 8,775,552 | B1 * | 7/2014 | Kessel ................ G06Q 10/20 |
| | | | 370/400 |
| 8,855,999 | B1 | 10/2014 | Elliot |
| 8,903,717 | B2 | 12/2014 | Elliot |
| 8,930,897 | B2 | 1/2015 | Nassar |
| 9,009,827 | B1 | 4/2015 | Albertson et al. |
| 9,201,920 | B2 | 12/2015 | Jain et al. |
| 9,223,773 | B2 | 12/2015 | Isaacson |
| 9,229,952 | B1 | 1/2016 | Meacham et al. |
| 2003/0074187 | A1 | 4/2003 | Ait-Mokhtar et al. |
| 2003/0172053 | A1 | 9/2003 | Fairweather |
| 2003/0177112 | A1 | 9/2003 | Gardner |
| 2004/0044992 | A1 | 3/2004 | Muller et al. |
| 2004/0083466 | A1 | 4/2004 | Dapp et al. |
| 2004/0221223 | A1 | 11/2004 | Yu et al. |
| 2004/0260702 | A1 | 12/2004 | Cragun et al. |
| 2005/0039119 | A1 | 2/2005 | Parks et al. |
| 2005/0091420 | A1 * | 4/2005 | Snover ................ G06F 9/45512 |
| | | | 710/1 |
| 2005/0183005 | A1 | 8/2005 | Denoue et al. |
| 2006/0271838 | A1 | 11/2006 | Carro |
| 2007/0074169 | A1 | 3/2007 | Chess et al. |
| 2007/0078672 | A1 | 4/2007 | Cohen |
| 2007/0112714 | A1 | 5/2007 | Fairweather |
| 2007/0233709 | A1 | 10/2007 | Abnous |
| 2008/0034327 | A1 | 2/2008 | Cisler et al. |
| 2008/0140387 | A1 | 6/2008 | Linker |
| 2008/0148398 | A1 | 6/2008 | Mezack et al. |
| 2008/0228467 | A1 | 9/2008 | Womack et al. |
| 2008/0281580 | A1 | 11/2008 | Zabokritski |
| 2009/0172821 | A1 | 7/2009 | Daira et al. |
| 2009/0177962 | A1 | 7/2009 | Gusmorino et al. |
| 2009/0228507 | A1 | 9/2009 | Jain et al. |
| 2009/0254970 | A1 | 10/2009 | Agarwal et al. |
| 2010/0011282 | A1 | 1/2010 | Dollard et al. |
| 2010/0204983 | A1 | 8/2010 | Chung et al. |
| 2010/0257015 | A1 | 10/2010 | Molander |
| 2010/0257515 | A1 | 10/2010 | Bates et al. |
| 2010/0306285 | A1 | 12/2010 | Shah et al. |
| 2010/0313119 | A1 | 12/2010 | Baldwin et al. |
| 2011/0213791 | A1 | 9/2011 | Jain et al. |
| 2011/0258216 | A1 | 10/2011 | Supakkul et al. |
| 2012/0137235 | A1 | 5/2012 | Ts et al. |
| 2012/0191446 | A1 | 7/2012 | Binsztok et al. |
| 2012/0221553 | A1 | 8/2012 | Wittmer et al. |
| 2012/0304150 | A1 | 11/2012 | Leithead et al. |
| 2013/0024268 | A1 | 1/2013 | Manickavelu |
| 2013/0086482 | A1 | 4/2013 | Parsons |
| 2013/0091084 | A1 | 4/2013 | Lee |
| 2013/0124193 | A1 | 5/2013 | Holmberg |
| 2013/0225212 | A1 | 8/2013 | Khan |
| 2013/0246395 | A1 * | 9/2013 | Charlet ................ G06F 16/258 |
| | | | 707/722 |
| 2013/0246560 | A1 | 9/2013 | Feng et al. |
| 2013/0251233 | A1 | 9/2013 | Yang et al. |
| 2013/0275446 | A1 | 10/2013 | Jain et al. |
| 2014/0019423 | A1 | 1/2014 | Leinsberger et al. |
| 2014/0047319 | A1 | 2/2014 | Eberlein |
| 2014/0244388 | A1 | 8/2014 | Manouchehri et al. |
| 2015/0046481 | A1 | 2/2015 | Elliot |
| 2015/0100559 | A1 | 4/2015 | Nassar |
| 2015/0142766 | A1 | 5/2015 | Jain et al. |
| 2015/0261847 | A1 | 9/2015 | Ducott et al. |
| 2017/0286467 | A1 * | 10/2017 | Eberlein ................ G06F 16/211 |
| 2018/0357273 | A1 * | 12/2018 | Srivastava .......... G06F 16/2448 |
| 2019/0266275 | A1 * | 8/2019 | Wernze ............ G06F 16/24539 |

FOREIGN PATENT DOCUMENTS

| | | |
|---|---|---|
| DE | 102014215621 | 2/2015 |
| EP | 2221725 | 8/2010 |
| EP | 2778913 | 9/2014 |
| EP | 2778914 | 9/2014 |
| EP | 2778986 | 9/2014 |
| EP | 2911078 | 8/2015 |
| EP | 3018553 | 5/2016 |
| GB | 2366498 | 3/2002 |
| GB | 2513007 | 10/2014 |
| GB | 2518745 | 4/2015 |
| NL | 2013306 | 2/2015 |
| NL | 2011642 | 8/2015 |
| WO | WO 2002/035376 | 5/2002 |
| WO | WO 2003/060751 | 7/2003 |
| WO | WO 2008/064207 | 5/2008 |
| WO | WO 2011/071833 | 6/2011 |

OTHER PUBLICATIONS

Anonymous, "BackTult—JD Edwards One World Version Control System," printed Jul. 23, 2007 in 1 page.

Chang-Hoo Jeong et al.: "Creating Semantic Data from Relational Database", 2013 International Conference on Social Computing, IEEE, Sep. 8, 2013, pp. 1081-1086.

Delicious, <http://delicious.com/> as printed May 15, 2014 in 1 page.

Geiger, Jonathan G., "Data Quality Management, the Most Critical Initiative You Can Implement", Data Warehousing, Management and Quality, Paper 098-29, SUGI 29, Intelligent Solutions, Inc., Bounder, CO, pp. 14, accessed Oct. 3, 2013.

Jesus Barrasa et al.: "Fund Finder: A case study of database-to-ontology mapping", Oct. 1, 2003, Retrieved from the Internet: URL: http://oa.upm.eS/5670/1/Workshopll.SemInt2003.pdf, [retrieved on Jan. 30, 2018].

Jesus Barrasa et al.: "R20, an Extensible and Semantically Based Database-to-Ontology Mapping Language", Aug. 1, 2004, Retrieved from the Internet: URL: http://www.cs.man.ac.uk/~ocorcho/documents/SWDB2004_BarrasaEtAl.pdf, [retrieved on-Jan. 30, 2018].

Johnson, Maggie, "Introduction to YACC and Bison".

Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.

Klemmer et al., "Where Do Web Sites Come From? Capturing and Interacting with Design History," Association for Computing Machinery, CHI 2002, Apr. 20-25, 2002, Minneapolis, MN, pp. 8.

Kokossi et al., "D7-Dynamic Ontoloty Management System (Design)," Information Societies Technology Programme, Jan. 10, 2002, pp. 1-27.

Konstantinos Vavliakis et al.: "RDOTE—Publishing Relational Databases into the Semantic Web", Journal of Systems and Software, vol. 86, No. 1, Jul. 16, 2012, pp. 89-99.

Miklau et al., "Securing History: Privacy and Accountability in Database Systems", 3rd Biennial Conference on Innovative Data Systems Research (CIDR), pp. 387-396, Asilomar, California, Jan. 7-10, 2007.

Morrison et al., "Converting Users to Testers: An Alternative Approach to Load Test Script Creation, Parameterization and Data Corellation," CCSC: Southeastern Conference, JCSC 28, 2, Dec. 2012, pp. 188-196.

Niepert et al., "A Dynamic Ontology for a Dynamic Reference Work", Joint Conference on Digital Libraries, Jun. 17-22, 2007, Vancouver, British Columbia, Canada, pp. 1-10.

Nivas, Tuli, "Test Harness and Script Design Principles for Automated Testing of non-GUI or Web Based Applications," Performance Lab, Jun. 2011, pp. 30-37.

(56) References Cited

OTHER PUBLICATIONS

Notice of Allowance for U.S. Appl. No. 14/044,800 dated Sep. 2, 2014.
Notice of Allowance for U.S. Appl. No. 14/148,568 dated Aug. 26, 2015.
Notice of Allowance for U.S. Appl. No. 14/508,696 dated Jul. 27, 2015.
Notice of Allowance for U.S. Appl. No. 14/533,433 dated Sep. 1, 2015.
Notice of Allowance for U.S. Appl. No. 14/879,916 dated Jun. 22, 2016.
Notice of Allowance for U.S. Appl. No. 15/383,787 dated Sep. 20, 2017.
Official Communiation for U.S. Appl. No. 14/148,568 dated Mar. 26, 2015.
Official Communication for Australian Patent Application No. 2014201511 dated Feb. 27, 2015.
Official Communication for Australian Patent Application No. 2014201506 dated Feb. 27, 2015.
Official Communication for Australian Patent Application No. 2014201507 dated Feb. 27, 2015.
Official Communication for Canadian Patent Application No. 2666364 dated Jun. 4, 2012.
Official Communication for EP Patent Application No. 17207860.2 dated Feb. 13, 2018.
Official Communication for European Patent Application No. 14158958.0 dated Apr. 16, 2015.
Official Communication for European Patent Application No. 14158977.0 dated Apr. 16, 2015.
Official Communication for European Patent Application No. 14158958.0 dated Jun. 3, 2014.
Official Communication for European Patent Application No. 14158977.0 dated Jun. 10, 2014.
Official Communication for European Patent Application No. 14158977.0 dated Mar. 11, 2016.
Official Communication for European Patent Application No. 14158958.0 dated Mar. 11, 2016.
Official Communication for European Patent Application No. 14159464.8 dated Feb. 18, 2016.
Official Communication for European Patent Application No. 14159629.6 dated Jul. 31, 2014.
Official Communication for European Patent Application No. 15155845.9 dated Oct. 6, 2015.
Official Communication for European Patent Application No. 15192965.0 dated Mar. 17, 2016.
Official Communication for Great Britain Patent Application No. 1404479.6 dated Aug. 12, 2014.
Official Communication for Great Britain Patent Application No. 1413935.6 dated Jan. 27, 2015.
Official Communication for Great Britain Patent Application No. 1413935.6 dated Dec. 21, 2015.
Official Communication for Great Britain Patent Application No. 1404479.6 dated Jul. 9, 2015.
Official Communication for Israel Patent Application No. 198253 dated Nov. 24, 2014.
Official Communication for Israel Patent Application No. 198253 dated Jan. 12, 2016.
Official Communication for Netherlands Patent Application No. 2013306 dated Apr. 24, 2015.
Official Communication for Netherlands Patent Application No. 2012434 dated Jan. 8, 2016.
Official Communication for New Zealand Patent Application No. 622414 dated Mar. 24, 2014.
Official Communication for New Zealand Patent Application No. 622484 dated Apr. 2, 2014.
Official Communication for New Zealand Patent Application No. 622404 dated Mar. 20, 2014.
Official Communication for New Zealand Patent Application No. 622389 dated Mar. 20, 2014.
Official Communication for New Zealand Patent Application No. 622497 dated Jun. 19, 2014.
Official Communication for New Zealand Patent Application No. 622513 dated Apr. 3, 2014.
Official Communication for New Zealand Patent Application No. 622497 dated Mar. 26, 2014.
Official Communication for U.S. Appl. No. 13/557,100 dated Apr. 7, 2016.
Official Communication for U.S. Appl. No. 14/025,653 dated Oct. 6, 2015.
Official Communication for U.S. Appl. No. 14/025,653 dated Mar. 3, 2016.
Official Communication for U.S. Appl. No. 14/134,558 dated Oct. 7, 2015.
Official Communication for U.S. Appl. No. 14/134,558 dated Aug. 26, 2016.
Official Communication for U.S. Appl. No. 14/134,558 dated May 16, 2016.
Official Communication for U.S. Appl. No. 14/148,568 dated Oct. 22, 2014.
Official Communication for U.S. Appl. No. 14/508,696 dated Mar. 2, 2015.
Official Communication for U.S. Appl. No. 14/526,066 dated Jan. 21, 2016.
Official Communication for U.S. Appl. No. 14/526,066 dated May 6, 2016.
Official Communication for U.S. Appl. No. 14/631,633 dated Feb. 3, 2016.
Official Communication for U.S. Appl. No. 14/879,916 dated Apr. 15, 2016.
Official Communication for U.S. Appl. No. 14/954,680 dated May 12, 2016.
Official Communication for U.S. Appl. No. 15/383,787 dated May 5, 2017.
Palantir, "Extracting and Transforming Data with Kite," Palantir Technologies, Inc., Copyright 2010, pp. 38.
Palantir, "Kite Data-Integration Process Overview," Palantir Technologies, Inc., Copyright 2010, pp. 48.
Palantir, "Kite Operations," Palantir Technologies, Inc., Copyright 2010, p. 1.
Palantir, "Kite," https://docs.palantir.com/gotham/3.11.1.0/adminreference/datasources.11 printed Aug. 30, 2013 in 2 pages.
Palantir, "The Repository Element," https://docs.palantir.eom/gotham/3.11.1.0/dataguide/kite_config_file.04 printed Aug. 30, 2013 in 2 pages.
Palantir, "Write a Kite Configuration File in Eclipse," Palantir Technologies, Inc., Copyright 2010, pp. 2.
Palantir, https://docs.palantir.com/gotham/3.11.1.0/dataguide/baggage/KiteSchema.xsd printed Apr. 4, 2014 in 4 pages.
Palermo, Christopher J., "Memorandum," [Disclosure relating to U.S. Appl. No. 13/916,447, filed Jun. 12, 2013, and related applications], Jan. 31, 2014 in 3 pages.
Symantec Corporation, "E-Security Begins with Sound Security Policies," Announcement Symantec, Jun. 14, 2001.
Wollrath et al., "A Distributed Object Model for the Java System," Conference on Object-Oriented Technologies and Systems, Jun. 17-21, 1996, pp. 219-231.

\* cited by examiner

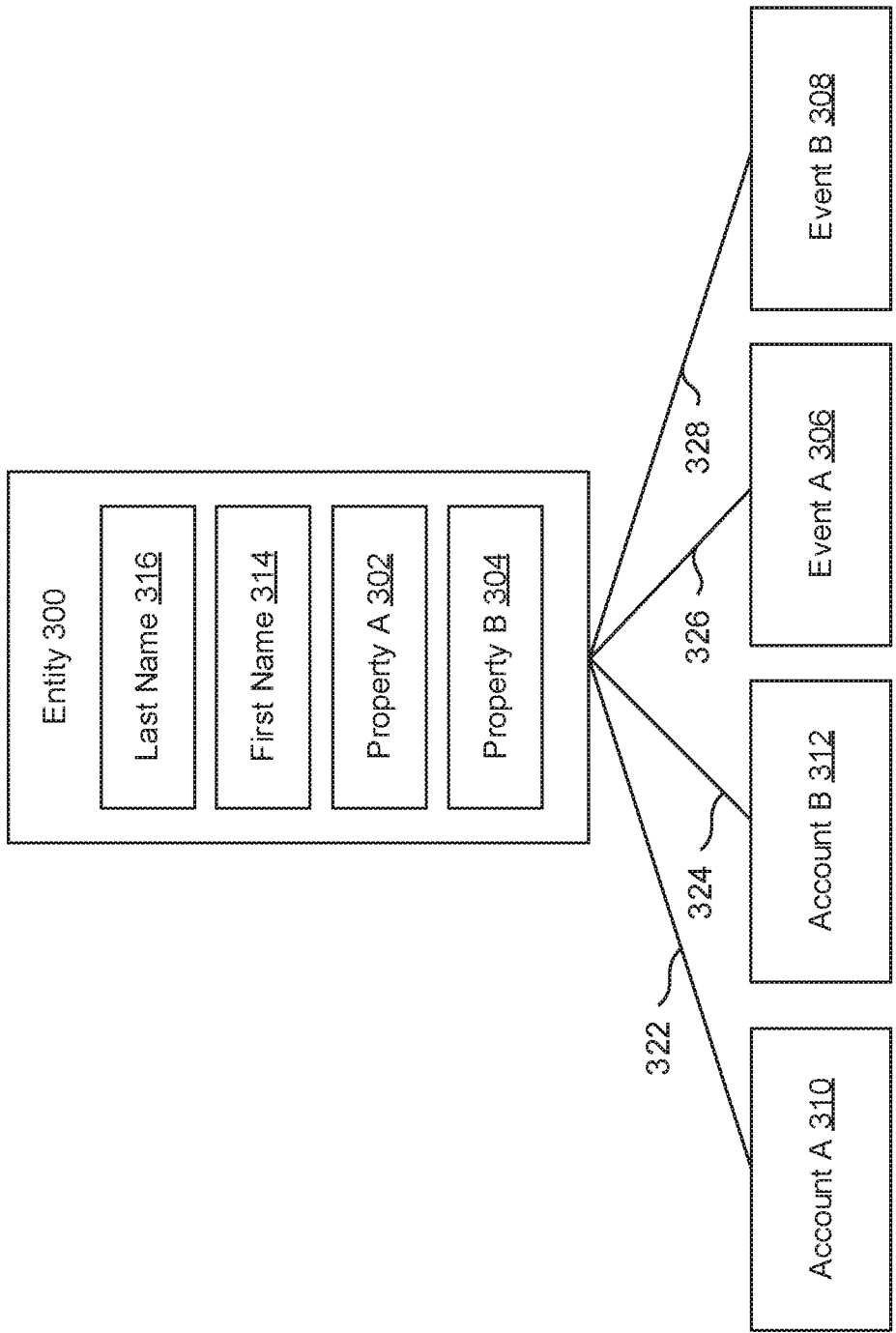

400 —

| Prop. A 402; | Prop. B 404; | Event A 406; | Event B 408; | Account A 410; | Account B 412; | F. Name 414; | L. Name 416 |

420 —

| Prop. A 422 | Prop. B 424 | Event A 426 | Event B 428 | Account A 430 | Account B 432 | F. Name 434 | L. Name 436 |

| L. Name 456; | F. Name 454; | Prop. A 442; | Prop. B 444; | Account A 450; | Account B 452; | Event A 446; | Event B 448; |

460 —

| L. Name 476 | F. Name 474 | Prop. A 462 | Prop. B 464 | Account A 470 | Account B 472 | Event A 466 | Event B 468 |

FIGURE 4B

ONTOLOGICAL MAPPING OF DATA

CROSS REFERENCE TO RELATED APPLICATIONS

This application claims the benefit under 35 U.S.C. § 119(e) of U.S. Provisional Application Ser. No. 62/671,941, filed May 15, 2018, the content of which is incorporated by reference in its entirety into the present disclosure.

FIELD OF THE INVENTION

This disclosure relates to approaches for mapping data based on an ontology of a platform.

BACKGROUND

Under conventional approaches, data may be transformed for import into a platform by applying the ontology of the platform onto the data. For example, tabular data may be transformed into object data for import into an object-oriented platform by applying the ontology of the object-oriented platform onto the tabular data. However, importation of data into a platform may restrict operations on the data to platform-oriented operations. For example, importation of data into an object-oriented platform may restrict operations on the data to object-oriented operations.

SUMMARY

Various embodiments of the present disclosure may include systems, methods, and non-transitory computer readable media configured to map data based on an ontology of a platform. A data set may be obtained. Data within the data set may be organized for use by an operation platform based on an operation ontology. The operation ontology may define an operation data structure for the operation platform. The data may be shaped based on a target ontology. The target ontology may define a target data structure for a target platform. The data may be shaped such that the data is mapped to the target data structure.

In some embodiments, the operation platform may include a table-oriented platform, and the operation ontology may include a table-oriented ontology. The table-oriented ontology may define a table-oriented data structure for the table-oriented platform. The target platform may include an object-oriented platform, and the target ontology may include an object-oriented ontology. The object-oriented ontology may define an object-oriented data structure for the object-oriented platform. For example, the object-oriented data structure may define objects and links between the objects.

In some embodiments, organizing the data based on the table-oriented ontology may include organizing the data into a single row or a single column based on the table-oriented ontology.

In some embodiments, organizing the data based on the table-oriented ontology may enable the table-oriented platform to perform tabular operations on the data. For example, the tabular operations on the data may include a diff operation that determines changes between multiple versions of the data. The changes between the multiple versions of data may be used to stage changes to the object data.

In some embodiments, shaping the data based on the object-oriented ontology may include ordering the data within the single row or the single column or generating tables from the data based on the object-oriented ontology. For example, generating the tables from the data based on the object-oriented ontology may include generating tables for the objects and the links between the objects.

In some embodiments, the data may be mapped to the target data structure such that a tabular data of the table-oriented platform is representative of an object data of the object-oriented platform. The tabular data may be linked to the object data.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 3 illustrates example object data, in accordance with various embodiments.

FIG. 4A illustrates example tabular data, in accordance with various embodiments.

FIG. 4B illustrates example tabular data, in accordance with various embodiments.

DETAILED DESCRIPTION

Figure 1:
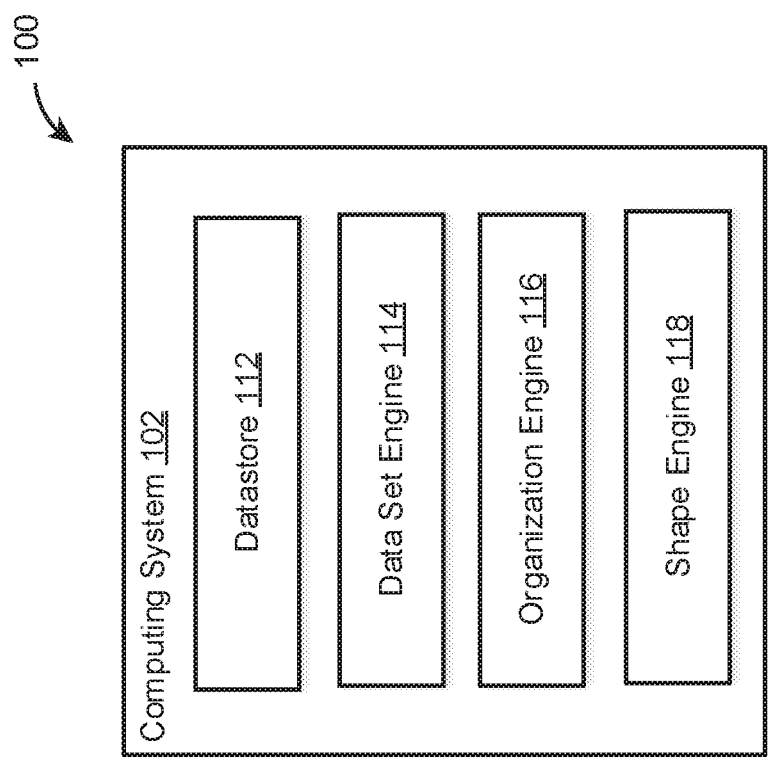
FIG. 1 illustrates an example environment for mapping data based on an ontology of a platform, in accordance with various embodiments.

A claimed solution rooted in computer technology overcomes problems specifically arising in the realm of computer technology. In various implementations, a computing system is configured to obtain a data set. The data set may include a collection of information relating to an entity, such as a person or an organization, a document, an event, or other things. Data within the data set may be organized for use by an operation platform based on an operation ontology. A platform may refer to hardware, application, framework, browser, service, and/or other platform. The operation ontology may define an operation data structure for the operation platform. The data may be shaped based on a target ontology. The target ontology may define a target data structure for a target platform. The data may be shaped such that the data is mapped to the target data structure. The organization and/or shaping of the data may be performed at the beginning of a pipeline, at the end of the pipeline, or between the beginning and the end of the pipeline.

For example, the operation platform may include a table-oriented platform and the operation ontology may include a table-oriented ontology defining a table-oriented data structure for the table-oriented platform. The target platform may include an object-oriented platform and the target ontology may include an object-oriented ontology defining an object-oriented data structure for the object-oriented platform. The data may mapped to the target data structure such that a tabular data of the table-oriented platform is representative of an object data of the object-oriented platform. The tabular data may or may not be linked to the object data. Linking of the tabular data to the object data may provide for synchronization of changes between the tabular data and the object data.

Organizing the data based on the table-oriented ontology may include organizing the data into a single row or a single column based on the table-oriented ontology. Shaping the data based on the object-oriented ontology may include ordering the data within the single row or the single column, or generating tables from the data based on the object-oriented ontology. For example, the object-oriented data structure may define objects and links between the objects, and generating the tables from the data based on the object-oriented ontology may include generating tables for the objects and the links between the objects.

Organizing the data based on the table-oriented ontology may enable the table-oriented platform to perform tabular operations on the data, such as a search operation to find data, a select operation to select data for use, a data manipulation operation to modify data, a diff operation to determine changes between multiple versions of data, a join operation to combine data, and/or a divide operation to separate data. Changes between multiple versions of data may be used to stage changes to an object data of the object-oriented platform.

The approaches disclosed herein may facilitate ontological mapping of data, where data of one platform is mapped based on an ontology of another platform. Data may be organized based on an ontology of one platform and shaped based on an ontology of another platform. For example, rather than importing data from a table-oriented platform into an object-oriented platform, which may restrict the type of operations that may be directly performed on the data to object operations, the data of the table-oriented platform, which is organized based on a table-oriented ontology, may be shaped based on the object-oriented ontology of the object-oriented platform. Such shaping of the data based on the object-oriented ontology may map a tabular representation of the data in the table-oriented platform to an object representation of the data in the object-oriented platform. Such tabular representation of the data may enable a user to use the table-oriented platform to directly perform tabular operations on the data.

FIG. 1 illustrates an example environment 100 for mapping data based on an ontology of a platform, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores (not shown) that is accessible to the computing system 102 (e.g., via one or more network(s)). In some embodiments, the datastore(s) may include various databases, application functionalities, application/data packages, and/or other data that are available for download, installation, and/or execution.

In various embodiments, the computing system 102 may include a datastore 112, a data set engine 114, an organization engine 116, a shape engine 118, other engines, and/or other components. The datastore 112 may include structured and/or unstructured sets of data that can be divided/extracted for provision when needed by one or more components of the environment 100. The datastore 112 may include one or more datasets of information. The datastore 112 may include one or more databases. The datastore 112 may include different data analysis modules that facilitate different data analysis tasks, patches for the applications/systems, custom application/functionalities built for particular application/systems, and/or other information to be used in the environment 100. While the computing system 102 is shown in FIG. 1 as a single entity, this is merely for ease of reference and is not meant to be limiting. One or more components/functionalities of the computing system 100 described herein may be implemented in a single computing device or multiple computing devices.

In various embodiments, the data set engine 114 may be configured to obtain one or more data sets. Obtaining a data set may include accessing, acquiring, analyzing, determining, examining, identifying, loading, locating, opening, receiving, retrieving, reviewing, storing, and/or otherwise obtaining the data set. For example, the data set engine 114 may search for and/or retrieve a data set relating to an entity. A data set may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). A data set may be obtained from one or more databases (e.g., stored within the datastore 112). A data set may be stored within a single file or across multiple files. For example, A data set relating to an entity may have been ingested into a database as one or more objects, and the data set engine 114 may retrieve the object(s) to obtain the data set.

A data set may include one or more collections of information relating to an entity. An entity may refer to a thing with distinct existence, such as a person, an organization, a document, an event, and/or other things. For example, a data set may include one or more collections of information relating to a person's name/identifier (e.g., driver license number, login name, nickname, handle), physical address, email address, telephone number, date of birth, birthplace, account, activity, and/or other information relating to the person. Other types of data set are contemplated.

Data within a data set may be organized according to one or more schemas. For example, a data set may be obtained from a source that have the data within the data set according to a source schema, with the source schema specifying a format for how the data is structured. As another example, a data set may be obtained from multiple sources that have the data within the data set according to one or more source schemas. Data may be obtained from multiple sources and collected into a data set. In some embodiments, a data set may be obtained by parsing data obtained from one or more sources to identify and collect data relevant to an entity. For example, a data set for an entity may be obtained by parsing one or more data objects for data that corresponds to and/or is associated with the entity. For instance, one or more data objects may be parsed for data that corresponds to and/or is associated with a person by looking for data that matches an identifier for the person.

In various embodiments, the organization engine 116 may be configured to organize one or more data within the data set for use by an operation platform. A platform may refer to an environment in which application and/or software is executed. A platform may refer to hardware, application, framework, browser, service, and/or other platform. An operation platform may refer to a platform in which one or more operations on data may be performed. The organization engine 116 may organize one or more data within the data set to facilitate the operation platform to perform one or more operations on the data. The organization engine 116 may organize the data based on an operation ontology and/or other information. An ontology may refer to a set of concepts and/or categories for data objects that define their properties and/or relationships between them. An ontology may define types of data used by a platform and/or how the data are stored for use by the platform. For instance, an ontology may define object types, object properties, and/or relationships of objects that exist within the platform. The operation ontology may define an operation data structure for the operation platform. The operation ontology may define object types, object properties, and/or relationships of objects that exist within the operation platform.

For example, the operation platform may include a table-oriented platform, and the operation ontology may include a table-oriented ontology. A table-oriented platform may refer to an environment in which application and/or software that use tabular data is executed. The table-oriented ontology may define a table-oriented data structure for the table-oriented platform. For instance, the table-oriented ontology may define how data is structured in a tabular form, such as in one or more cells, one or more rows, one or more columns, and/or one or more tables. The table-oriented ontology may define how data in different cells, rows, columns, and/or tables may be related to each other and/or associated with an entity.

In some embodiments, organizing the data based on the table-oriented ontology may include organizing the data into a single row or a single column based on the table-oriented ontology. For example, a data set may include a collection of information relating to a person, such as properties of the person, events associated with the person (e.g., events attended by the person), accounts associated with the person (e.g., accounts used by the person, accounts in the person's name), the person's first name, the person's last name, and/or other information relating to the person. The organization engine 116 may organize one or more data within the data set based on the table-oriented ontology such that the properties of the person, the events associated with the person, the accounts associated with the person, the person's first name, the person's last name, and/or other information relating to the person are organized into a single row or a single column within a table based on the table-oriented ontology. The data may be organized into a single cell or multiple cells within the single row/column.

That is, the organization engine 116 may gather the relevant data for an entity, such as a person, into a single row or a single column. Such organization of data facilitates operations relating to the data for the entity because the relevant data is gathered together. Rather than performing operations on one or more data and bringing the modified data together using complicated join operations (which may be prone to error that results in wrong data/wrong type of data being joined together), the organization engine 116 may organize the data within the data set based on the table-oriented ontology before operations are performed on the data. In some embodiments, organizing the data based on the table-oriented ontology may include performing one or more clean-up operations on the data before and/or after the data is organized into a single row or a single column. Other types of operation platform, operation ontology, and organization of data are contemplated.

In some embodiments, organizing the data based on the table-oriented ontology may enable the table-oriented platform to perform tabular operations on the data. Tabular operations may refer to operations on data stored in tabular form. Tabular operations may use and/or modify data stored within one or more cells, one or more rows, one or more columns, and/or one or more tables. Tabular operations may create and/or remove data within one or more cells, one or more rows, one or more columns, and/or one or more tables. Tabular operations may use and/or modify (e.g., create, change, remove) one or more cells, one or more rows, one or more columns, and/or one or more tables. Tabular operations may include data operations that take advantage of data stored in tabular form. For example, tabular operations may include a search operation to find data, a select operation to select data for use, a data manipulation operation to modify data, a diff operation to determine changes between multiple versions of data, a join operation to combine data, a divide operation to separate data and/or other tabular operations. In some embodiments, changes between multiple versions of data (e.g., as determined by a diff operation) may be used to stage changes to the data and/or corresponding data object(s), such as an object data of an object-oriented platform.

In various embodiments, the shape engine 118 may be configured to shape the data based on a target ontology and/or other information. A target ontology may define a target data structure for a target platform. A target ontology may define object types, object properties, and/or relationships of objects that exist within a target platform. A target platform may refer to a platform in which the data is to be provided and/or to a platform to which the data is to be mapped. The shape engine 118 may shaped the data based on the target ontology such that the data is mapped to the target data structure.

For example, the target platform may include an object-oriented platform, and the target ontology may include an object-oriented ontology. An object-oriented platform may refer to an environment in which application and/or software that use object data is executed. The object-oriented ontology may define an object-oriented data structure for the object-oriented platform. For instance, the object-oriented ontology may define how data is structured in an object form, such as within one or more JSON objects. The object-oriented ontology may define objects and links between objects. The object-oriented ontology may define properties of objects and/or links between objects. For example, the shape engine 118 may shape tabular data (e.g., organized by the organization engine 116) based on the object-oriented ontology such that the tabular data of a table-oriented platform is representative of an object data of the object-oriented platform. Other types of target platform, target ontology, and shaping of data are contemplated.

For example, an object-oriented ontology may define one or more types of objects (object data) and how the objects are linked to (e.g., related to, associated with) other objects. The object-oriented ontology may define properties of objects/different types of objects and/or properties of links/ different types of links between objects. The object-oriented ontology may define the kinds of things that may be represented in the object-oriented platform, and may provide structure for object. Different objects/object types may be derived from, for example, entity types (e.g., person, organization, document, event). The object-oriented ontology may define numbers and/or types of properties of the object, such as identifying data, characteristics data, temporal data, geospatial data, and/or other data associated with the object/ entity. The object-oriented ontology may define what types of links are allowed to be made and/or to exist with the object.

For instance, an object-oriented ontology may define an object data (person object) used to store data about a person, and may include data properties for storing name, address, occupation, e-mail address, phone number, and/or other information relating to the person. The object-oriented ontology may permit the person object to be linked to other person objects (e.g., friends, associates), linked to organization objects (e.g., organizations to which the person belongs), linked to event objects (e.g., events attended or invited to), linked to document objects (e.g., authored/used by the person), linked to account objects (e.g., opened/used by the person), and/or other objects. The object-oriented ontology may define the structure of data stored as an object property, such as data fields and/or type of data associated with the data fields. The object-oriented ontology define links that may exist between two objects, such as whether two objects/two object types may be linked, whether the links are directional or symmetric, and/or other properties of the links. The shape engine 118 may shape the data based on the type(s) of objects defined by the object-oriented ontology, links between objects, properties of the objects, and/or properties of the links between objects.

In some embodiments, shaping the data based on the object-oriented ontology may include ordering the data within the single row or the single column based on the object-oriented ontology. For example, data relating to a person may be organized (e.g., by the organization engine 116) into a single row or a single column within a table based on the table-oriented ontology. For instance, a single row or a single column within a table may contain, in order, the properties of the person, the events associated with the person, the accounts associated with the person, the person's first name, the person's last name, and/or other information relating to the person. The data may be organized into a single cell or multiple cells within the single row/column. The shape engine 118 may shape the data by ordering the data within the single row/column to match the object-oriented data structure of the object-oriented ontology. For example, the data within the single row/column may be ordered such that the single row/column may contain, in order, the person's last name, the person's first name, the properties of the person, the accounts associated with the person, the events associated with the person, and/or other information relating to the person. In some embodiments, the shape engine 118 may shape the data by splitting data contained in one cell among multiple cells. For example, the shape engine 118 may generate columns or rows for different types of data. For instance, the shape engine 118 may generate a last name column, a first name column, one or more property columns, one or more account columns, one or more event columns, and/or other columns and place the data within relevant column(s).

In some embodiments, shaping the data based on the object-oriented ontology may include generating tables from the data based on the object-oriented ontology. The object-oriented data structure may define objects and links between the objects, and the shape engine 118 may generate tables for the objects and the links between the objects. For example, the shape engine 118 may generate tables for different types of objects and generate one or more tables for links between the objects. For example, the shape engine 118 may generate a person table (listing different persons), a property table (listing different properties of persons), an account table (listing different accounts), an event table (listing different events), a link table (listing relationships between entries in different tables, such as a relationship pair), and/or other tables, and place the data within relevant table(s). In some embodiments, multiple types of data may be placed within a single table. For instance, the person table and the property table may be merged into a single person table such that the person table lists both different persons (e.g., separated into different rows) and different properties of the persons (e.g., separated into different columns).

The organization and shaping of data disclosed herein may result in data of an operation platform being structured based on a target ontology. That is, the data may be integrated for use by an operation platform while respecting the data structure of a target platform. For example, data within a data set may be organized into one or more rows, one or more columns, and/or one or more tables based on a table-oriented ontology of a table-oriented platform (operation platform) while the structure of the row(s), column(s), and/or table(s) and/or the placement of data within the row(s), column(s), and/or table(s) may be determined based on an object-oriented ontology of an object-oriented platform (target platform). The data may be stored in row(s), column(s), and/or table(s) based on how the data is stored in an object-representation (e.g., JSON representation) of the object-oriented platform. That is, the data may be mapped to the object-oriented data structure (target data structure) such that a tabular data of the table-oriented platform (operation platform) is representative of an object data of the object-oriented platform (target platform).

The data of the operation platform may be used to perform one or more operations on the data. For example, the tabular data of the table-oriented platform may be used to perform one or more tabular operations of the data. Rather than importing the data into the target platform (e.g., object-oriented platform), the operation platform (e.g., table-oriented platform) may be used to perform operations on the data. Such may provide for more efficient (e.g., less computationally intensive, faster) operations on the data. For example, an object-oriented platform may not be efficient when running operations such as searches or collecting statistical information from data contained within object data. A table-oriented platform may be more suited to perform searches, collecting statically information, and/or other operations that are more suited to be performed on data in tabular form. Rather than importing the data into an object-oriented platform as an object data (and performing costly operations by the object-oriented platform or importing the object data back into tabular form), a representing of the object data may be stored as tabular data for the table-oriented platform to perform tabular operations. For example, a tabular representation of a JSON object may be stored for tabular operations to be run by the table-oriented platform. The tabular data may be kept as a representation of the object data in the table-oriented platform and/or imported into the object-oriented platform for object operations.

The tabular data of the table-oriented platform (operation platform) may be an equal but separate copy of the data within the object data of the object-oriented platform (target platform). The tabular data of the table-oriented platform may or may not be linked to the object data of the object-oriented platform. Linking of the tabular data to the object data may provide for synchronization of changes between the tabular data and the object data. That is, based on changes to the tabular data of the table-oriented platform, changes to the linked object data may be pushed to the object-oriented platform. Based on changes to the object data of the object-oriented platform, changes to the linked tabular data may be pushed to the table-oriented platform.

The organization and shaping of data disclosed herein may result in more efficient staging of data for the target platform. For example, generating a tabular data that is representative of an object data of an object-oriented platform (target platform) may allow for more efficient staging of changes to the object data. Importation of data into an object-oriented platform may require staging all data into a staging area, comparing the data in the staging area to the object data already present in the object-oriented platform, and then importing the difference between the staged data and the object data in the object-oriented platform to the object-oriented platform. Staging data in the staging area and performing a comparison of object data may be resource intensive (e.g., processing power, processing time, memory usage).

The table-oriented platform may be able to more efficiently perform and/or otherwise streamline one or more steps for staging data. For example, rather than determining changes to the object data for staging based on comparison of multiple versions of the object data, a diff operation may be performed on the tabular data to determine changes between multiple versions of the data. That is, changes between multiple versions of the data determined using the tabular data representation of the object data may be used to stage changes to the object data of the object-oriented platform. The comparison of different versions of the tabular data (e.g., a diff operation) may be performed more efficiently by the table-oriented platform than the object-oriented platform, and/or may be performed in a distributed fashion by the table-oriented platform. As another example, changes to the tabular data may be stored by the table-oriented platform for use in determining how the tabular data has changed and in determining what data should be staged for importation into the object-oriented platform. The table-oriented platform may track (e.g., using version control) how data has been changed (e.g., addition of data, modification of data, removal of data) since prior importation into the object-oriented platform. By using the tabular data of the table-oriented platform, only changes to the object data (e.g., addition of data, modification of data, removal of data) in the object-oriented platform may be staged within the staging area and may be imported into the object-oriented platform without a comparison with the object data in the object-oriented platform.

The organization and shaping of data disclosed herein may be flexible in terms of where and when they are performed. For example, organization and/or shaping of data into a tabular data that is representative of an object data may be performed at the beginning of a pipeline for processing data, at the end of the pipeline for processing data, or between the beginning and the end of the pipeline for processing data. Once the tabular data representative of the object data is generated, other tabular operations may be performed on the data as part of and/or in addition to the pipeline for processing data.

Figure 2:
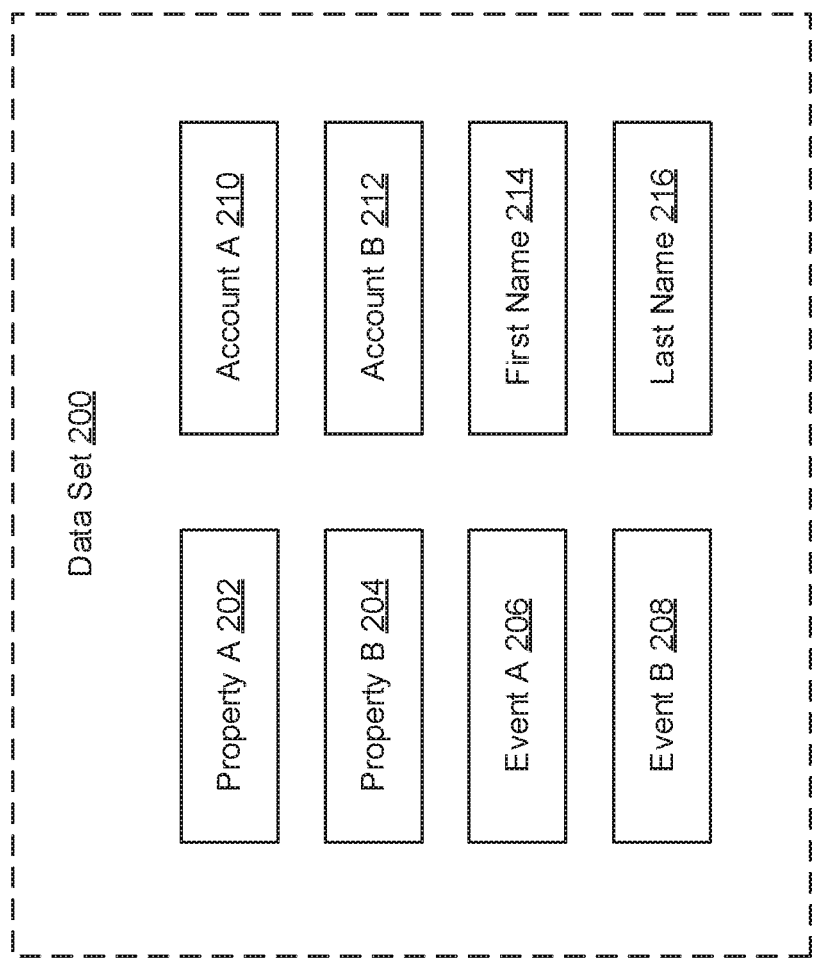
FIG. 2 illustrates an example data set, in accordance with various embodiments.

FIG. 2 illustrates an example data set 200, in accordance with various embodiments. The data set 200 may include one or more collections of information relating to an entity, such as a person, an organization, a document, an event, and/or other things. For example, the data set 200 may include one or more collections of information relating to a person, such as information relating to (e.g., identifying, describing) properties of the person (a property A 202, a property B 204), events associated with the person (an event A 206, an event B 208), accounts associated with the person (an account A 210, an account B 212), the person's first name (a first name 214), the person's last name (a last name 216), and/or other information relating to the person. The data within the data set 200 by obtained from a single source or multiple sources. For example, the data within the data set 200 may be obtained from a single object data of an object-oriented platform or obtained from multiple sources and collected into the data set 200. In some embodiments, the data set 200 may be obtained by parsing data obtained from one or more sources to identify and collect data relevant to the person. For example, the data set 200 may be obtained by parsing one or more data objects for data that corresponds to and/or is associated with the person. For instance, one or more data objects may be parsed for data that corresponds to and/or is associated with the person by looking for data that matches an identifier for the person.

FIG. 3 illustrates example object data 300, 306, 308, 310, 312, in accordance with various embodiments. The structure of the object data 300, 306, 308, 310, 312 may be defined by an object-oriented ontology. That is, the object-oriented ontology may define how data is structured in an object form, such as within one or more of the object data 300, 306, 308, 310, 312. The object-oriented ontology may define the object data 300, 306, 308, 310, 312 and links 322, 324, 326, 328 between the object data 300, 306, 308, 310, 312. The links 322, 324, 326, 328 may represent one or more relationships between the entity object data 300 and the other object data 310, 312, 306, 308. The object-oriented ontology may define properties of object data 300, 306, 308, 310, 312 and/or links 322, 324, 326, 328 between object data. For example, the object-oriented ontology may define the entity object data 300 as including data for a last name 316, a first name 314, a property A 302, and a property B 304. The properties of the links 322, 324, 326, 328 may define the directionality of the links 322, 324, 326, 328.

FIG. 4A illustrates example tabular data 400, 420, in accordance with various embodiments. The tabular data 400, 420 may include data that is organized based on an ontology of a platform. For example, the tabular data 400, 420 may include one or more data within the data set 200 that is organized according to a table-oriented ontology of a table-oriented platform. For instance, the table-oriented ontology may define a table-oriented data structure for the table-oriented platform. The table-oriented ontology may define how data is structured in a tabular form, such as in one or more cells, one or more rows, one or more columns, and/or one or more tables. The table-oriented ontology may define how data in different cells, rows, columns, and/or tables may be related to each other and/or associated with an entity.

For example, one or more data within a data set may be organized into a single row as shown in the tabular data 400, 420. The tabular data 400 may include, in order, data for a property A 402, and a property B 404, an event A 406, an event B 408, an account A 410, an account B 412, a first name 414, a last name 416 of a person. The data within the tabular data 400 may be included within a single cell of a table. The tabular data 420 may include, in order, data for a property A 422, and a property B 424, an event A 426, an event B 428, an account A 430, an account B 432, a first name 434, a last name 434 of a person. The data within the tabular data 402 may be included within multiple cells of a row of a table. For example, different data may be included within different columns within a row of a table.

FIG. 4B illustrates example tabular data 440, 460, in accordance with various embodiments. The tabular data 440, 460 may include data that is shaped based on an ontology of a platform. For example, the tabular data 440, 460 may include one or more data within the data set 200, the tabular data 400, and/or the tabular data 420 that is shaped according to an object-oriented ontology of an object-oriented platform. For instance, the object-oriented ontology may define an object-oriented data structure for the object-oriented platform, such as shown in FIG. 3.

For example, one or more data within the data set 200 and/or the tabular data 400, 420 may be shaped into a single row as shown in the tabular data 440, 460. The tabular data 440 may include, in order, data for a last name 456, a first name 454, a property A 442, a property B 444, an account A 450, an account B 452, an event A 446, and an event B 448 of a person. The tabular data 460 may include, in order, data for a last name 476, a first name 474, a property A 462, a property B 464, an account A 470, an account B 472, an event A 466, and an event B 468 of a person. For example, different data may be included within different columns within a row of a table. The data within the tabular data 440, 460 may be shaped to match the object-oriented data structure of the object-oriented ontology, such as shown in FIG. 3. The data may be included within a single cell of a table, such as shown in the tabular data 440. The data may be included within a multiple cells of a row of a table, such as shown in the tabular data 460.

Figure 4C:
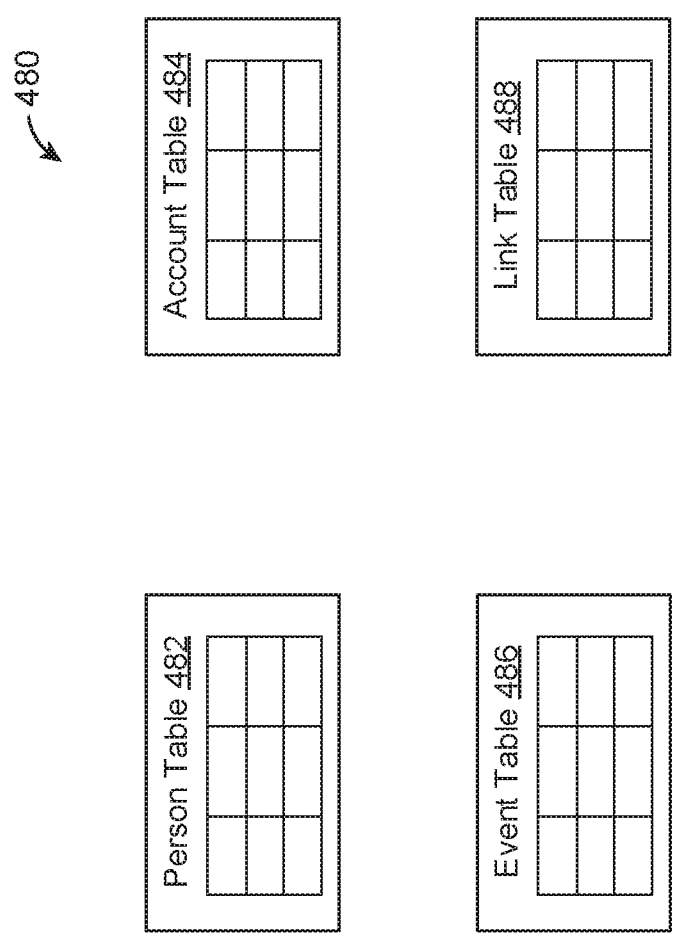
FIG. 4C illustrates example tabular data, in accordance with various embodiments.

FIG. 4C illustrates example tabular data 480, in accordance with various embodiments. The tabular data 480 may include data that is shaped based on an ontology of a platform. For example, the tabular data 480 may include one or more data within the data set 200, the tabular data 400, and/or the tabular data 420 that is shaped according to an object-oriented ontology of an object-oriented platform. For instance, the object-oriented ontology may define an object-oriented data structure for the object-oriented platform, such as shown in FIG. 3.

For example, one or more data within the data set 200 and/or the tabular data 400, 420 may be shaped into a person table 482, an account table 484, an event table 486, and a link table 488. The person table 482 may list persons within the data set 200 and/or the tabular data 400, 420, the account table 484 may list accounts within the data set 200 and/or the tabular data 400, 420, the event table 486 may list events within the data set 200 and/or the tabular data 400, 420, and the link table 488 may list relationships between entries in different tables 482, 484, 486, such as different relationship pairs. In some embodiments, multiple types of data may be placed within a single table. For instance, the person table 482 may lists both persons (e.g., separated into different rows) and properties of the persons (e.g., separated into different columns).

Figure 5:
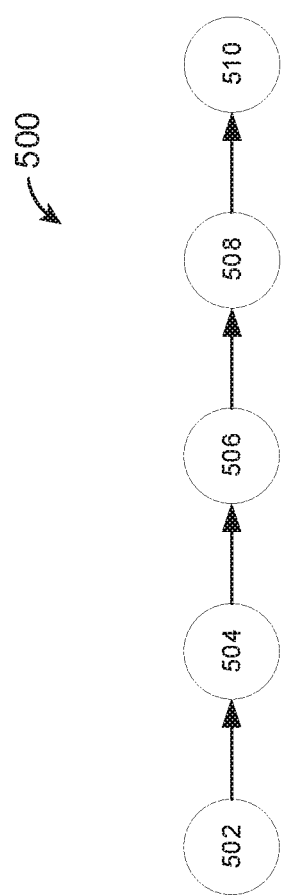
FIG. 5 illustrates an example data pipeline, in accordance with various embodiments.

FIG. 5 illustrates an example data pipeline 500, in accordance with various embodiments. A data pipeline may include multiple data processing elements in a sequence. For example, the data pipeline 500 may include data processing elements 502, 504, 506, 508, 510 in a sequence. A data pipeline may include a linear pipeline, such as shown in the data pipeline 500, or a branching pipeline. The organization of data based on an operation ontology and shaping of data based on a target ontology may be flexible in terms of where these data processing elements are placed within a data pipeline. For example, organization and/or shaping of data into a tabular data that is representative of an object data may be performed at the beginning of the data pipeline 500 (represented by the data processing element 502), at the end of the data pipeline 500 (represented by the data processing element 510), or between the beginning and the end of the data pipeline f500 (represented by one or more of the data processing elements 504, 506, 508). Once the tabular data representative of the object data is generated, other operations may be performed on the data as part of and/or in addition to the data pipeline 500.

Figure 6:
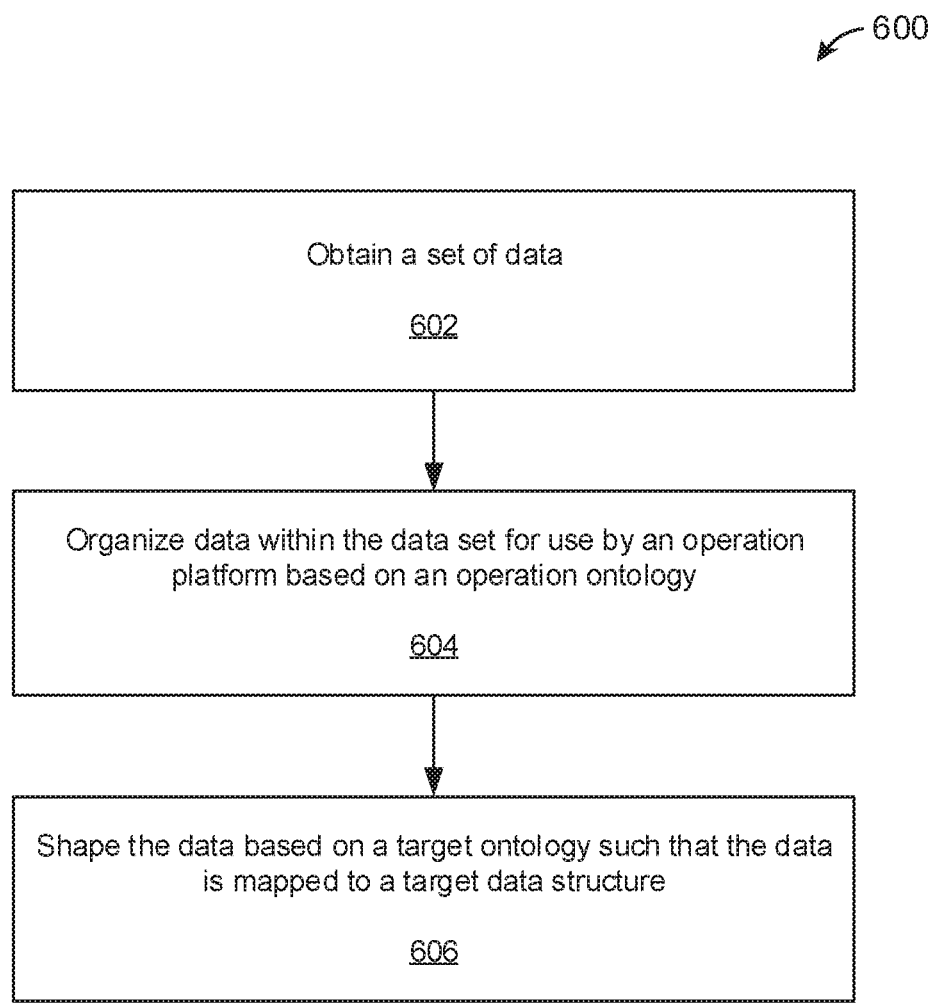
FIG. 6 illustrates a flowchart of an example method, in accordance with various embodiments.

FIG. 6 illustrates a flowchart of an example method 600, according to various embodiments of the present disclosure. The method 600 may be implemented in various environments including, for example, the environment 100 of FIG. 1. The operations of method 600 presented below are intended to be illustrative. Depending on the implementation, the example method 600 may include additional, fewer, or alternative steps performed in various orders or in parallel. The example method 600 may be implemented in various computing systems or devices including one or more processors.

At block 602, a data set may be obtained. At block 604, data within the data set may be organized for use by an operation platform based on an operation ontology. The operation ontology may define an operation data structure for the operation platform. At block 606, the data may be shaped based on a target ontology. The target ontology may define a target data structure for a target platform. The data may be shaped such that the data is mapped to the target data structure.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
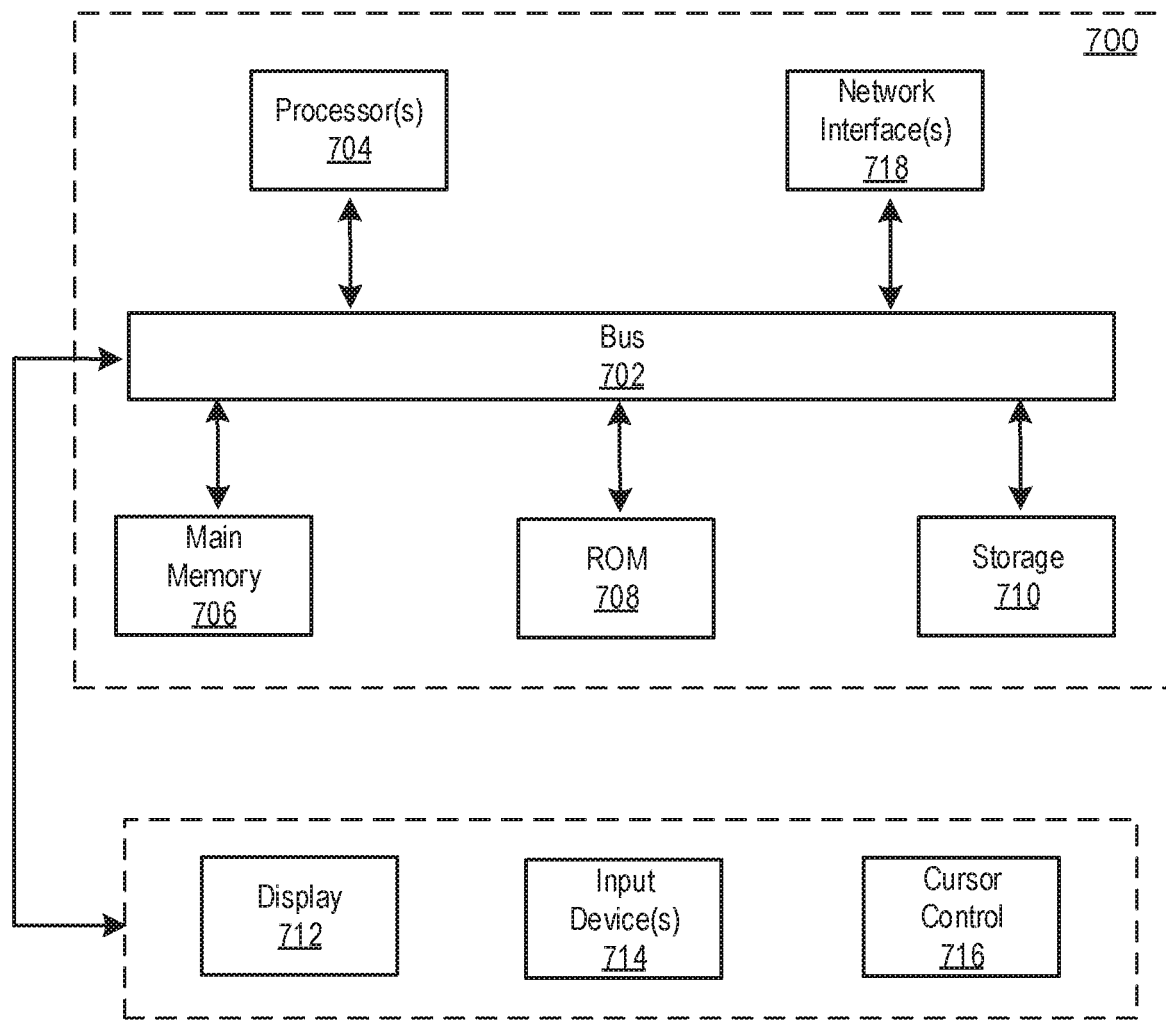
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
obtaining a data set;
obtaining a request to perform an operation on the data set;
determining that the operation is more efficient when performed on a table-oriented platform compared to a target platform;
in response to determining that the operation is more efficient when performed on a table-oriented platform:
generating a tabular representation of data within the data set for use by the table-oriented platform based on a tabular ontology, the tabular ontology defining a tabular data structure for the table-oriented platform, wherein generating the tabular representation of the data based on the tabular ontology includes organizing the data into rows or columns, wherein the data in the rows or columns comprise entity data relating to a particular entity and attribute data relating to multiple attributes of the particular entity;
shaping the data based on a target ontology, the target ontology defining a target data structure for the target platform, such that the data is mapped to the target data structure, wherein shaping the data based on the target ontology comprises ordering data in the tabular data structure to match the target data structure for the target platform to permit a first operation defined by the tabular ontology and a second operation defined by the target ontology to be performed on the shaped data;
storing the tabular representation in the table-oriented platform;
importing the tabular representation into the target platform;
receiving, by the table-oriented platform, a change to the tabular representation that has occurred since the importing of the tabular representation;
determining, by the table-oriented platform, a first subset of the data set affected by the change;
determining, by the table-oriented platform, a second subset of the shaped data corresponding to the first subset; and
importing, by the table-oriented platform, the second subset into the target platform.

2. The system of claim 1, wherein the target platform includes an object-oriented platform and the target ontology includes an object-oriented ontology defining an object-oriented data structure for the object-oriented platform.

3. The system of claim 2, wherein ordering the data in the operation data structure to match the target data structure for the target platform includes ordering the data within a single row or a single column or generating tables from the data based on the object-oriented ontology.

4. The system of claim 3, wherein the object-oriented data structure defines objects and links between the objects, and generating the tables from the data based on the object-oriented ontology includes generating tables for the objects and the links between the objects.

5. The system of claim 2, wherein the data is mapped to the target data structure such that tabular data of the table-oriented platform is representative of an object of the object-oriented platform.

6. The system of claim 5, wherein the tabular data is linked to the object.

7. The system of claim 5, wherein generating the tabular representation enables the table-oriented platform to perform tabular operations on the data.

8. The system of claim 7, wherein the tabular operations on the data includes a diff operation that determines changes between multiple versions of the data.

9. The system of claim 8, wherein the changes between the multiple versions of data are used to stage changes to the object data.

10. The system of claim 1, wherein the instructions, when executed by the one or more processors, further cause the system to perform organizing the data into the single row or the single column, the organizing comprising consolidating the data from multiple rows or multiple columns in the operation data structure into the single row of the single column, and wherein ordering the data in the operation data structure to match the target data structure for the target platform comprises expanding the single row or the single column into multiple rows or multiple columns in the target data structure.

11. The system of claim 1, wherein the importing of the second subset into the target platform further comprises refraining from importing any shaped data besides the second subset into the target platform.

12. A method implemented by a computing system including one or more processors and storage media storing machine-readable instructions, wherein the method is performed using the one or more processors, the method comprising:
obtaining a data set;
obtaining a request to perform an operation on the data set;
determining that the operation is more efficient when performed on a table-oriented platform compared to a target platform;
in response to determining that the operation is more efficient when performed on a table-oriented platform:
generating a tabular representation of data within the data set for use by the table-oriented platform based on a tabular ontology, the tabular ontology defining a tabular data structure for the table-oriented platform, wherein generating the tabular representation of the data based on the tabular ontology includes organizing the data into rows or columns, wherein the data in the rows or columns comprise entity data relating to a particular entity and attribute data relating to multiple attributes of the particular entity;
shaping the data based on a target ontology, the target ontology defining a target data structure for the target platform, such that the data is mapped to the target data structure, wherein shaping the data based on the target ontology comprises ordering data in the tabular data structure to match the target data structure for the target platform to permit a first operation defined by the tabular ontology and a second operation defined by the target ontology to be performed on the shaped data;
storing the tabular representation in the table-oriented platform;
importing the tabular representation into the target platform;
receiving, by the table-oriented platform, a change to the tabular representation that has occurred since the importing of the tabular representation;
determining, by the table-oriented platform, a first subset of the data set affected by the change;
determining, by the table-oriented platform, a second subset of the shaped data corresponding to the first subset; and
importing, by the table-oriented platform, the second subset into the target platform.

13. The method of claim 12, wherein the target platform includes an object-oriented platform, the target ontology includes an object-oriented ontology defining an object-oriented data structure for the object-oriented platform.

14. The method of claim 13, wherein ordering the data in the operation data structure to match the target data structure for the target platform includes ordering the data within a single row or a single column or generating tables from the data based on the object-oriented ontology.

15. The method of claim 14, wherein the object-oriented data structure defines objects and links between the objects, and generating the tables from the data based on the object-oriented ontology includes generating tables for the objects and the links between the objects.

16. The method of claim 13, wherein the data is mapped to the target data structure such that tabular data of the table-oriented platform is representative of an object of the object-oriented platform, and organizing the data based on the table-oriented ontology enables the table-oriented platform to perform tabular operations on the data.

17. The method of claim 16, wherein the tabular data is linked to the object.

18. The method of claim 17, wherein the tabular operations on the data includes a diff operation that determines changes between multiple versions of the data and the changes between the multiple versions of data are used to stage changes to the object data.

19. A non-transitory computer readable medium comprising instructions that, when executed, cause one or more processors to perform:
obtaining a data set;
obtaining a request to perform an operation on the data set;
determining that the operation is more efficient when performed on a table-oriented platform compared to a target platform;
in response to determining that the operation is more efficient when performed on a table-oriented platform:
generating a tabular representation of data within the data set for use by the table-oriented platform based on a tabular ontology, the tabular ontology defining a tabular data structure for the tabular platform, wherein generating the tabular representation of the data based on the tabular ontology includes organizing the data into rows or columns, wherein the data in the rows or columns comprise entity data relating to a particular entity and attribute data relating to multiple attributes of the particular entity;
shaping the data based on a target ontology, the target ontology defining a target data structure for the target platform, such that the data is mapped to the target data structure, wherein shaping the data based on the target ontology comprises ordering data in the table-oriented data structure to match the target data structure for the target platform to permit a first operation defined by the tabular ontology and a second operation defined by the target ontology to be performed on the shaped data;
storing the tabular representation in the table-oriented platform;
importing the tabular representation into the target platform;
receiving, by the table-oriented platform, a change to the tabular representation that has occurred since the importing of the tabular representation;
determining, by the table-oriented platform, a first subset of the data set affected by the change;
determining, by the table-oriented platform, a second subset of the shaped data corresponding to the first subset; and
importing, by the table-oriented platform, the second subset into the target platform.

* * * * *